Feb. 9, 1926.
F. H. OWENS
MOTION PICTURE MACHINE
Filed May 12, 1923   2 Sheets-Sheet 1
1,572,863
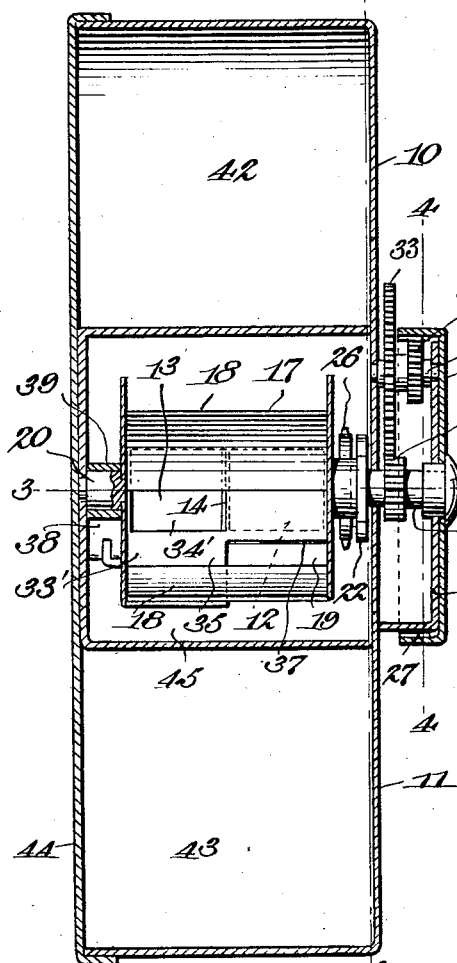
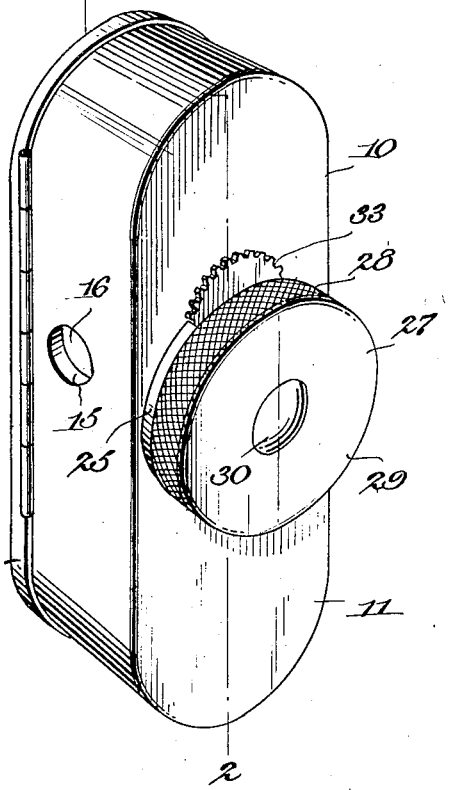
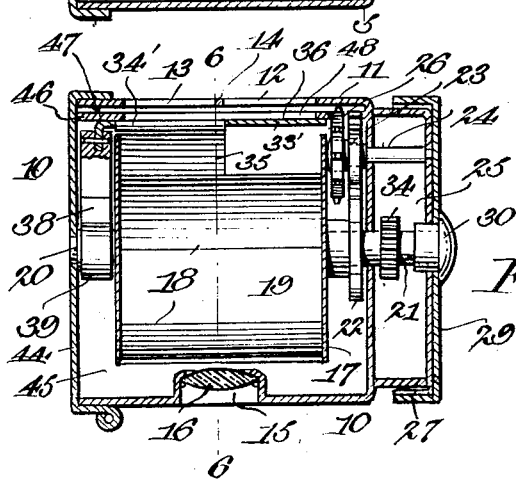
Freeman H. Owens.
INVENTOR
BY James A. G. Roehl.
ATTORNEY Feb. 9, 1926. 1,572,863
F. H. OWENS
MOTION PICTURE MACHINE
Filed May 12, 1923 2 Sheets-Sheet 2

Freeman H. Owens,
INVENTOR

ATTORNEY

Patented Feb. 9, 1926.

1,572,863

UNITED STATES PATENT OFFICE.

FREEMAN H. OWENS, OF NEW YORK, N. Y.

MOTION-PICTURE MACHINE.

Application filed May 12, 1923. Serial No. 638,448.

*To all whom it may concern:*

Be it known that I, FREEMAN H. OWENS, a citizen of the United States, and resident of New York, in the county of New York and State of New York, have invented certain new and useful Improvements in Motion-Picture Machines, of which the following is a specification.

This invention relates to motion picture machines, and more particularly to a motion picture machine adapted for use with motion picture film having plural rows of images or image spaces; and has special reference to the provision of a machine of this character in which the plural rows may be exposed, viewed or projected in a simple manner without laterally moving either the film or the objective.

It is a principal object of the invention to provide a motion picture machine wherein a motion picture film having plural rows or series of images may be viewed by the eye of the observer upon looking into an objective of the machine. While in the present embodiment of the invention a direct viewing exhibiting machine is a prime object, I would have it clearly understood that the principles of the invention may be more broadly employed, and may be put to various uses, whether it be exhibiting by projection of pictures upon a screen or by direct viewing or by the photographing of objects for use as a camera.

An important object of the invention is to provide a machine of this character which may be used in connection with a film having a plurality of series of sequential photographs or pictures of objects in motion and associated with mechanism of the machine whereby the pictures of the respective series can be successively exhibited in rapid order and by means which will be positive to produce a motion picture effect.

Another object of the invention is to provide a machine of this character in which the separate series of pictures can be operated in immediate succession without the necessity of rethreading the film after each operation.

The various important features will be particularly pointed out hereinafter in connection with a detailed description of a preferred embodiment of my invention which I have selected for illustration in the accompanying drawings, in which similar reference characters indicate corresponding parts in the several views.

In the drawings:

Figure 1 is a perspective view of the machine.

Figure 2 is a section taken on line 2—2 of Figure 1.

Figure 3 is a section on line 3—3 of Figure 2.

Figure 7 is a perspective view of the closure plate, and

Figure 4:
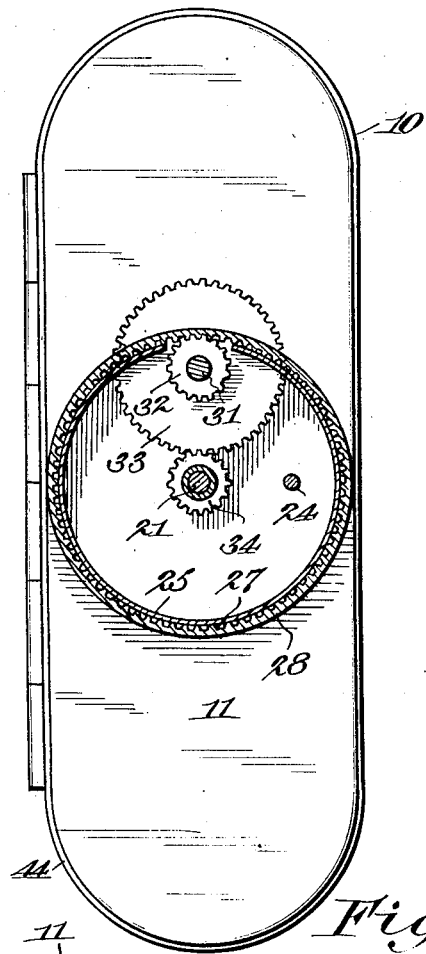
Figure 4 is a section on line 4—4 of Figure 2.

In carrying the invention into practice, I employ a film preferably made of celluloid of suitable width to accommodate two longitudinal series or rows of pictures A and B, the latter adjoining the former at the line C. The pictures of the series or row A start from one end of the film strip and those of the other series of row B from the other end thereof. The pictures of both series are right side up to thereby permit the pictures of both series to be successively exhibited from the machine without reversing or re-winding the film as will be fully described hereinafter. The pictures of the series B can be sequential with those of series A and of the same subject, or they may treat of an entirely different subject. The marginal surfaces of the film strips are formed with the usual sprocket holes D.

In connection with a film constructed as aforesaid, I have devised a machine 10 whose casing 11 is formed at one side with an exposure window having lateral dimensions for exposing a film containing laterally displaced rows of images, the said exposure window preferably consisting of a pair of frame apertures 12 and 13 disposed side by side and separated from each other by a narrow strip or bar 14 over which the longitudinal joinder C of the film is adapted to pass. Common to both of said frame apertures is a single objective aperture 15 equipped with a lens 16. The objective aperture is formed in an opposite wall of the casing 11 and disposed on a line drawn directly between the frame apertures 12 and 13.

Operating in the casing 11 between the frame apertures 12 and 13 and said objective aperture 15 is a barrel shutter 17 provided with blade portions 18, four in number, and separated by openings 19 of a corresponding number. The blades and their co-acting openings 19 are arranged in diametrically opposite pairs, as shown. I do not confine myself to a shutter of this type and may use in lieu thereof a shutter of any suitable well known form. I find a barrel shutter very effective when used in the combination and arrangement of parts herein shown. The shutter carries shaft stubs 20 and 21 mounted to rotate in the walls of the casing.

The stub shaft 21 is provided with a four pin wheel 22 which co-acts with a correspondingly formed star wheel 23 of an ordinary Geneva movement. The shaft 24 of the star wheel 23 is journaled in the cylindrical off-set part 25 of the casing 11 and said shaft has mounted thereon a sprocket wheel 26 positioned with respect to the frame apertures 12 and 13 so as to engage in the sprocket openings in the adjacent marginal edge of the film. In this manner, it will be observed that the usual intermittent movement will be imparted to the film in operative time with movements of the shutter 17 across said frame apertures 12 and 13.

In order that motion can be properly transmitted to said intermittent mechanism, I employ a circular internal gear 27 having a knurled manipulating surface 28 and a closed head 29. The said head 29 is keyed or secured at 30 to rotate on the stub shaft 21. Journaled to rotate in the wall of the off-set part 25 of the casing 11 and in an adjacent wall of the latter, is a shaft 31 having a fixed gear wheel 32 in constant mesh with the internal gear 27 as shown in Figure 2. This shaft 31 carries a large gear 33 which meshes with a small gear 34 on the said stub shaft 21. From this construction, the intermittent mechanism herein referred to and co-acting shutter 17 are made to revolve in one direction when the gear 27 is rotated clockwise and in an opposite direction when said gear is operated counter-clockwise. The purpose of this arrangement will appear hereinafter.

Figure 5:
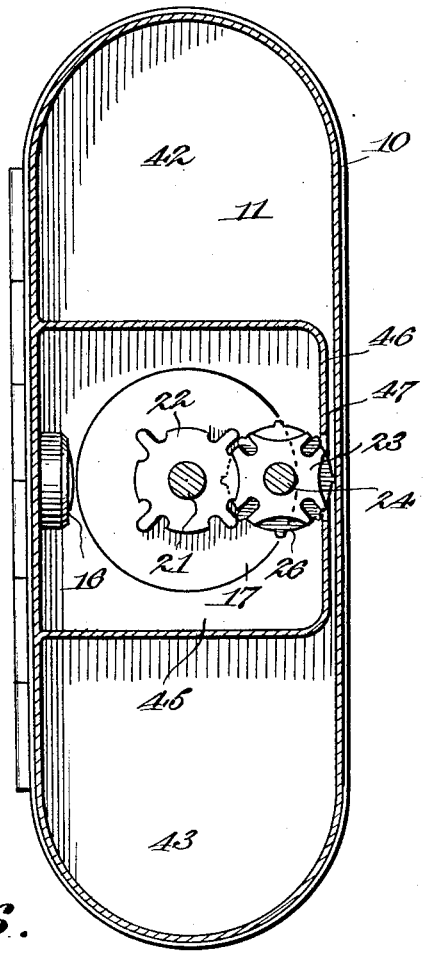
Figure 5 is a section on line 5—5 of Figure 2.

The length of the shutter 17 is such that its ends fall slightly outside the outer side walls of the frame apertures 12 and 13 as best shown in Figure 5.

The construction to this point includes means for intermittently moving a film strip respectively in two directions across the frame apertures 12 and 13. In this respect, it shall be understood that the frame aperture 12 operatively mates with the pictures of the series B and that the aperture 13 operatively mates with the pictures of the series A, the former when the intermittent mechanism is moved clockwise and the latter when said mechanism is moved counter-clockwise.

Figure 6:
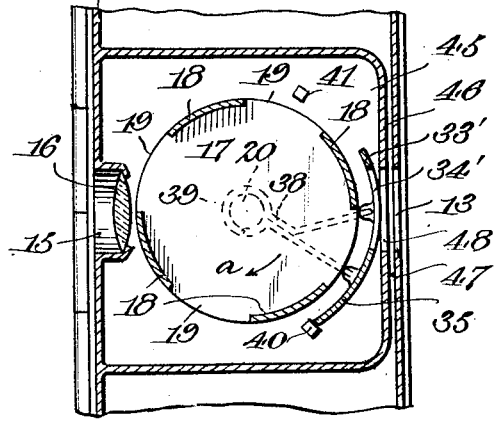
Figure 6 is a section on line 6—6 of Figure 3.
Figure 8:
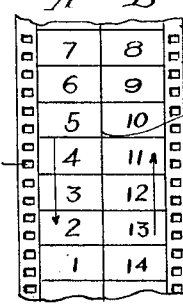
Figure 8 is a view in elevation of a part of a film strip constructed in accordance with my invention.

In order that the pictures of each of said series A and B will be exhibited separately or in operative succession with corresponding movements of the aforesaid intermittent mechanism, I provide an oscillating closure plate 33' having at one side of its center an opening 34' and an adjacent closure surface 35. At the other side of its center, and in reverse order of the arrangement just described, the plate is formed with a closure 36 and a cut out portion 37. The opening 34' and its co-acting surface 35 are adapted to mate with the frame aperture 13 and the surface 36 and cut out portion 37 with the aperture 12. In order that this closure plate can be moved to correspond or synchronize with the respective movements of the intermittent mechanism, I mount the plate at one side upon a bracket 38 having a spring-hub 39 which yieldingly embraces the stub shaft 20 of the shutter 17. On reference to Figure 6 of the drawings it will be seen that when the shutter rotates in the direction of the arrow "a", the plate is moved to engage with a stop 40 in the casing 11. This registers the opening 34' with the frame aperture 13 and causes the surface 36 to cover the adjacent frame aperture 12. When the shutter revolves in an opposite direction, the plate 33' is correspondingly turned until it engages with the stop 41. At this time, the cut-out 37 is made to register with the frame aperture 12 and the surface 35 closes over the aperture 13. This operation may be repeated indefinitely to cause an operative successive exhibition of the picture series A and B without interferring with persistance of vision. I am able to cause one series of pictures to be momentarily obliterated in an effective manner while maintaining a fixed focal point during operations of both of said series of pictures. The hub 39 acts as a clutch and is free to yieldingly grip the shaft 20 and move therewith between the stops 40 and 41. When the plate 33' engages against either of said stops 40 or 41, the shaft 20 revolves in said hub 39 but the plate is held in a relatively stationary position.

The casing 11 is provided with an upper film magazine 42 and a lower magazine 43 in order that the film can be properly fed back and forth and across the frame apertures 12 and 13. The magazines are closed by a swinging cover 44. This cover forms part of the casing 11 and when same is opened, access may be gained to the magazines 42 and 43.

The shutter mechanism 17 is arranged in a housing 45 carried by the casing 11. This housing has a wall 46 disposed parallel with the front wall of the casing 11 so as to define therewith a film guide 47. This wall 46 is apertured at 48 in line with aforesaid apertures 12 and 13. This permits the film to be drawn in a straight manner across said apertures for proper exhibiting purposes.

While I have described a shutter 17 having four blades 18 and a corresponding number of openings, it will be understood this can be varied to suit the occasion. I have described a film having two series of pictures A and B, the pictures of both series arranged right side up. This is preferred as a matter of convenience to avoid having to interchange the film spools after each run of the film. It will be obvious that other and numerous changes may be made, such as dispensing with the shutter mechanism or the film moving mechanism and moving a film by hand, while employing other principles of the invention. It will be further apparent that when operated as a direct viewing machine, the lens 16 may be dispensed with, and wherein in the following claims I have employed the term "objective", I desire it to be understood that this may consist merely in an objective opening with or without a lens. It is intended that the hereto appended claims permit of these alterations.

What I claim as my invention is:

1. A motion picture machine comprising a film exposure window, means for moving a film containing laterally displaced rows of images longitudinally in either of opposite directions past the said exposure window, a stationary objective for the said exposure window adapted for cooperation with either of the rows of images, and means for obliterating one of the rows of images when the film is moved in one direction, and for obliterating the other of said rows when the film is moved in the opposite direction.

2. A motion picture machine comprising a film exposure window having lateral dimensions for exposing a film containing laterally displaced rows of images, the film being movable longitudinally in either of opposite directions past the said exposure window, a stationary objective for the said exposure window adapted for cooperation with either of the rows of images, and means for obliterating one of the rows of images when the film is moved in one direction, and for obliterating the other of said rows when the film is moved in the opposite direction.

3. A motion picture machine comprising a film exposure window having lateral dimensions for exposing a film containing laterally displaced rows of images, the film being movable longitudinally in either of opposite directions past the said exposure window, a stationary objective for the said exposure window adapted for cooperation with either of the rows of images, and means for covering a part and uncovering another part of said window for exposing only one row of images when the film is moved in a given direction.

4. A motion picture machine comprising a film exposure window, means for intermittently moving a film containing laterally displaced rows of images longitudinally in either of opposite directions past the said exposure window, a stationary objective for the said exposure window adapted for cooperation with either of the rows of images, and means operated by reversing the direction of operation of the said film moving means for obliterating one of the rows of images when the film is moved in one direction, and for obliterating the other of said rows when the film is moved in the opposite direction.

5. A motion picture machine comprising a film exposure window having lateral dimensions for exposing a film containing laterally displaced rows of images, the film being movable longitudinally in either of opposite directions past the said exposure window, a stationary objective for the said exposure window adapted for cooperation with either of the rows of images, and means operated by the reversing of the direction of movement of the film for obliterating one of the rows of images when the film is moved in one direction, and for obliterating the other of said rows when the film is moved in the opposite direction.

6. A motion picture machine comprising a film exposure window having lateral dimensions for exposing a film containing laterally displaced rows of images, a stationary objective for said exposure window adapted for cooperation with either of the rows of images, film moving mechanism and means operating automatically with the film moving mechanism to cover part of said window when the mechanism is operated in one direction and for covering another part of said window when the mechanism is operated in an opposite direction.

7. A machine of the class described comprising a casing having a pair of openings at one side and an objective opening at its opposite side, a shutter mounted between the said pair of openings and said objective opening, means to move a picture film across said pair of openings in time with operations of said shutter, and means separate from said shutter operative to close one opening of the aforesaid pair while exposing the film to the other opening of said pair.

8. A machine of the class described comprising a casing having a pair of openings at one side and an objective opening at its opposite side, a shutter mounted adjacent to said pair of openings, means to move a picture film across said pair of openings in time with operations of the shutter, means separate from said shutter operative to close one opening of the aforesaid pair while uncovering the other of said openings, and means for rendering said last means operative when the intermittent means is placed in motion.

9. A machine of the class described comprising a casing having a pair of openings at one side and an objective opening at its opposite side, means to move a film strip across said pair of openings, a shutter co-acting with said pair of openings and said means, and automatically controlled means separate from said shutter operative for closing one opening of said pair while uncovering the other of said openings.

10. A motion picture machine comprising a film exposure window having lateral dimensions for exposing a film containing laterally displaced rows of images, means for moving a film longitudinally in either of opposite directions past the said exposure window, and an oscillatable member for uncovering part of said window for exposing one row of images when the film is moved in one direction and for uncovering another part of said window for exposing another row of images when the film is moved in the opposite direction.

11. A motion picture machine comprising a film exposure window having lateral dimensions for exposing a film containing laterally displaced rows of images, means for moving a film longitudinally in either of opposite directions past the said exposure window, a stationary objective for said exposure window adapted for cooperation with any of the rows of images, a shutter movable in cooperation with the film moving means, and an oscillatable member actuated by the shutter for covering part of said window so as to expose only a single row of images, when the film is moved in a given direction.

12. A motion picture machine having a plurality of frame apertures, means for intermittently moving a picture film across said frame apertures, a shutter co-acting with said frame apertures, and means supported by the shutter and movable with respect thereto for covering one of said frame apertures while uncovering the other of said apertures.

13. A motion picture machine having a plurality of frame apertures and a single objective aperture, means for intermittently moving a picture film across said frame apertures, a shutter co-acting with said frame apertures, and means movable in concentric relation to the shutter for closing one of said frame apertures while uncovering the other of said frame apertures.

14. A motion picture machine having a pair of frame apertures, means for moving a film intermittently across said frame apertures, a shutter co-acting with said frame apertures, and means in frictional engagement with the shutter and actuated thereby to close one of said frame apertures while uncovering the other of said frame apertures.

15. A motion picture machine having a pair of frame apertures and a single objective aperture, means for moving a film intermittently across said frame apertures, a shutter co-acting with said frame apertures, and means hung from the shaft of the shutter and movable thereabout respectively in two directions and adapted to cover one of said frame apertures and uncover the other of said apertures when the shutter revolves.

16. A motion picture machine having a pair of frame apertures and a single objective aperture, a revolving shutter co-acting with said frame apertures, means for intermittently moving a film across said appertures, and an oscillating member having a portion yieldingly embracing the shaft of the shutter and a portion constructed to cover one of said frame apertures while uncovering the other of said apertures in any direction of movement of said member.

17. A machine of the class described having a pair of frame apertures and a single coacting objective aperture, and an oscillating member operating to cover one of said frame apertures while uncovering the other of said apertures, and means for operatively exposing the pictures of a film from the uncovered aperture.

18. A motion picture machine having a pair of frame apertures and a single objective stationary aperture, a film moving means, and a closure plate movable to respectively and successively open and close said frame apertures as the film moving means is moved respectively clockwise and counter clockwise.

19. A motion picture machine having a frame aperture and an objective aperture, a revolving shutter located between said apertures, a pin wheel carried by the shutter, a star wheel co-acting with said pin wheel, and a sprocket wheel driven by the star wheel and associated with said frame aperture to move a film intermittently thereacross in time with operations of said shutter.

20. A shutter and intermittent mechanism for motion picture machines comprising an apertured barrel, a pin wheel carried by said barrel, a star wheel co-acting with said pin wheel, and a sprocket wheel driven by said pin wheel.

Signed at New York, in the county of New York and State of New York this 25th day of April, A. D. 1923.

FREEMAN H. OWENS.